United States Patent [19]

Allen

[11] Patent Number: 5,174,169
[45] Date of Patent: Dec. 29, 1992

[54] ANGULARLY ADJUSTABLE TIMING GEAR

[75] Inventor: Timothy R. Allen, West Chester, Ohio

[73] Assignee: Cloyes Gear & Products, Inc., Willoughby, Ohio

[21] Appl. No.: 880,535

[22] Filed: May 8, 1992

[51] Int. Cl.$^5$ .............. F16H 35/06; F16H 55/12; G05G 1/00; F16C 3/04

[52] U.S. Cl. .................................. 74/395; 74/447; 74/571 M; 74/600; 123/90.15; 403/4; 403/260

[58] Field of Search ................ 74/395, 400, 405, 406, 74/446, 447, 568 R, 571, 571 L, 571 M, 600, 603; 123/90.15, 90.17, 90.31, 90.6; 403/4, 258, 260, 261; 474/900

[56] References Cited

U.S. PATENT DOCUMENTS

| | | | |
|---|---|---|---|
| 379,022 | 3/1888 | Morgan | 74/447 X |
| 781,219 | 1/1905 | Mills | 74/395 |
| 1,138,799 | 5/1915 | Scott | 74/571 |
| 1,687,987 | 10/1928 | Moon | 74/446 |
| 1,691,408 | 11/1928 | Palmer | 74/395 |
| 3,470,823 | 10/1969 | Seeger | 74/571 X |
| 3,490,303 | 1/1970 | Rosenberg | 74/395 |
| 3,523,465 | 8/1970 | Harrell | 74/568 |
| 3,678,781 | 7/1972 | Rohrberg et al. | 74/571 M |
| 3,734,073 | 5/1973 | Walter et al. | 74/395 X |
| 4,096,836 | 6/1978 | Kopich | 74/395 |
| 4,532,822 | 8/1985 | Godlewski | 74/395 X |
| 4,538,336 | 9/1985 | Oliver | 74/571 M X |

Primary Examiner—Leslie A. Braun
Assistant Examiner—David W. Laub
Attorney, Agent, or Firm—Fay, Sharpe, Beall, Fagan, Minnich & McKee

[57] ABSTRACT

An adjustable timing gear arrangement having an output shaft and a camshaft operable in timed relationship with the output shaft comprises a first rotatable drive member driven by the output shaft with a second rotatable drive member mounted on the camshaft and operably connected with the first drive member for rotation in timed relation therewith. The second drive member is mounted on the camshaft for rotation on a common axis with the second drive member and the camshaft and is secured thereto to fix the angular relationship of the members. The mounting permits limited relative angular rotation of the members when the members are not so secured. For adjusting the relative angular positions of the second drive member and the camshaft there is an assembly including an unthreaded, cylindrical stud extending from the camshaft into a radially extending slotted opening through the second drive member. The opening includes angularly spaced, parallel sides. An eccentric cam is freely rotatable on the cylindrical stud and closely fits between the parallel sides of the slotted opening. A tool receiving portion on the cam is arranged for permitting selected rotation of the cam to cause relative angular adjustment of the second drive member relative to the camshaft. The slotted opening and the eccentric cam have cooperating interengaging portions lying in a plane perpendicular to the axis of rotation of the camshaft for retaining the cam in the slotted opening while permitting free rotation of the cam relative to the second drive member.

11 Claims, 2 Drawing Sheets

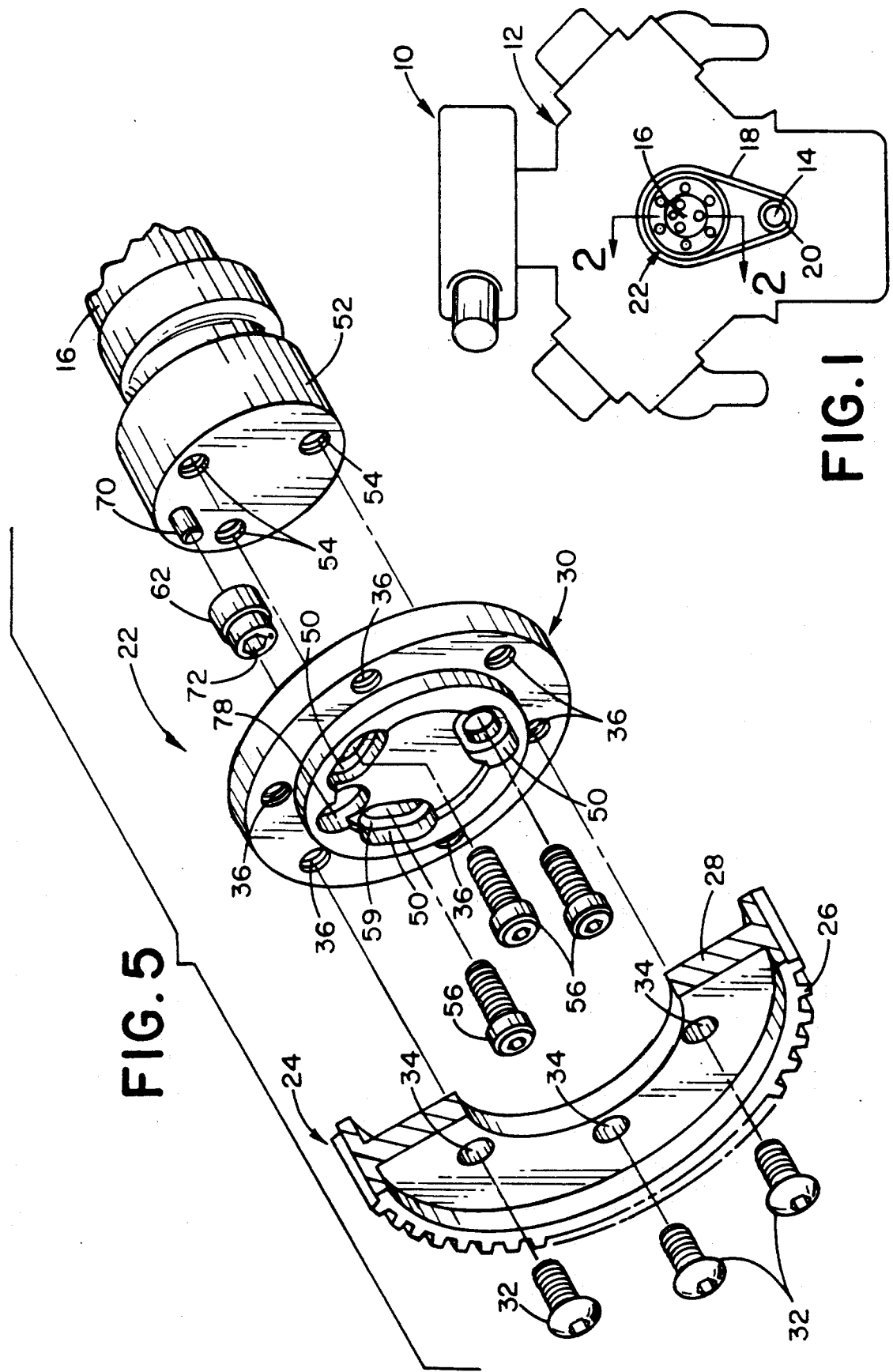

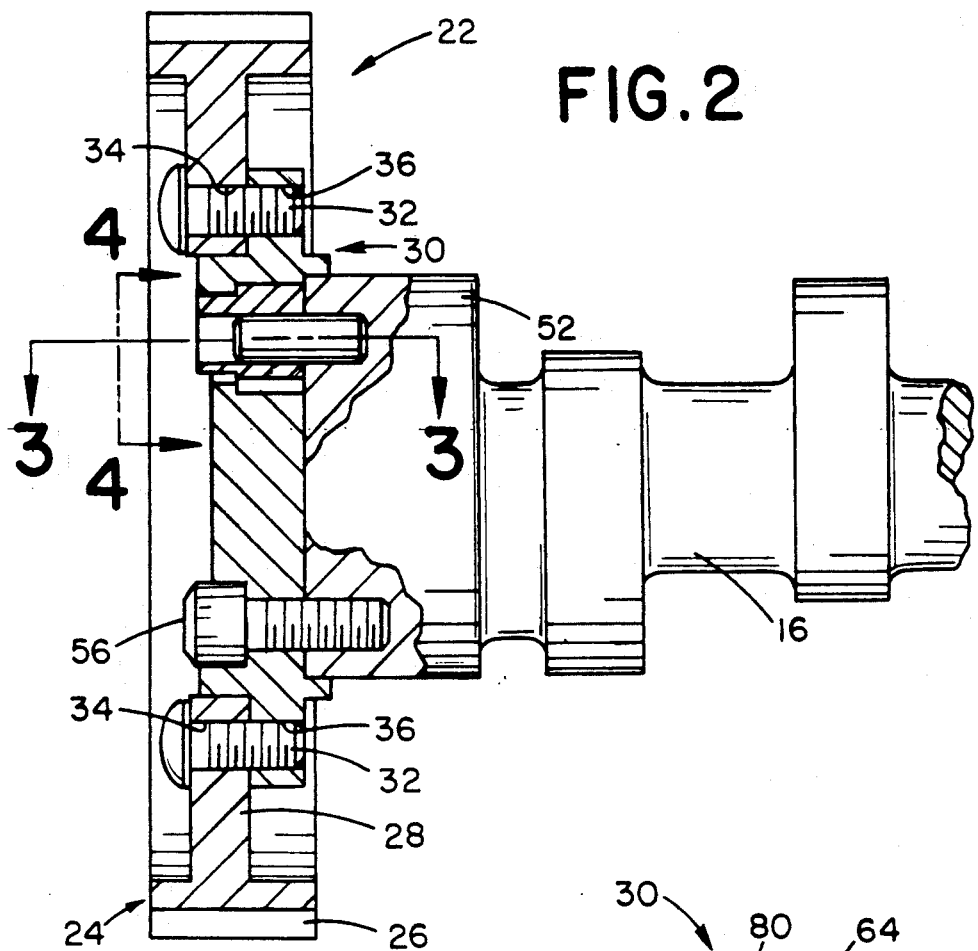
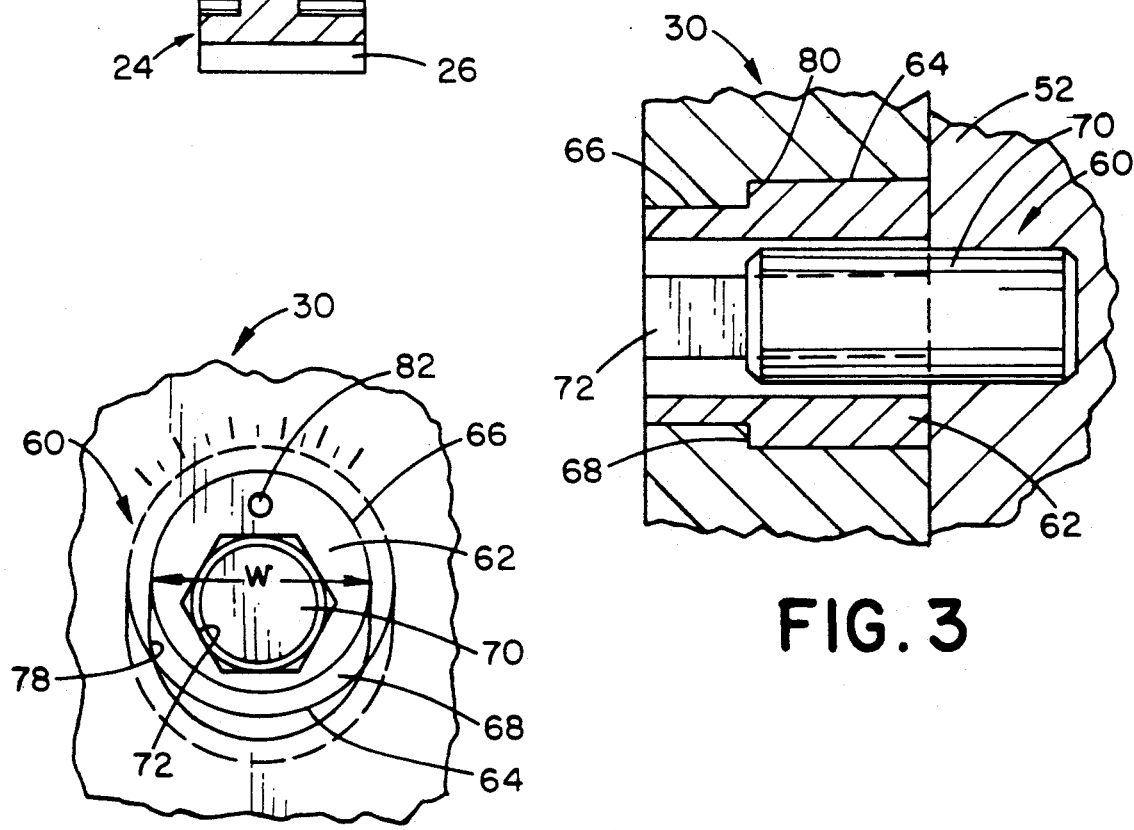

ANGULARLY ADJUSTABLE TIMING GEAR

BACKGROUND OF THE INVENTION

The subject invention is directed toward the art of gears and, more particularly, to a gear arrangement which allows rapid manual adjustment of the relative angular relationship between a timing gear and an associated driving or driven mechanism.

The invention is especially suited and intended for use in internal combustion engines for adjusting engine valve timing by permitting the drive sprocket or gear to be angularly adjusted on the engine camshaft.

High performance internal combustion engines have been provided with different arrangements for allowing manual adjustment of the drive sprocket or gear relative to the camshaft. Certain of these prior arrangements have been difficult to finely adjust or to lock into their adjusted position. Others have been unsatisfactory because of the general complexity or because they weaken the various components involved in the camshaft drive train.

BRIEF DESCRIPTION OF THE INVENTION

The subject invention provides an adjustable timing gear or sprocket assembly of the general type described which is relatively simple in construction but which can be quickly adjusted to a desired setting. The assemblies of the invention can be rigidly locked in their adjusted position.

In accordance with the invention, there is provided an adjustable timing gear arrangement for use on internal combustion engines of the type having an output shaft and a camshaft operable in timed relationship with the output shaft. The variable camshaft timing drive comprises a first rotatable drive member driven by the output shaft with a second rotatable drive member mounted on the camshaft and operably connected with the first drive member for rotation in timed relation therewith. Means are provided for mounting the second drive member on the camshaft for rotation on a common axis with the second drive member and the camshaft having opposed engagable surfaces capable of being secured together to fix the angular relationship of the members. The mounting means are formed to permit limited relative angular rotation of the members when the surfaces are not so secured. And, there are means for adjusting the relative angular positions of the second drive member and the camshaft and means for securing the second drive member to the camshaft in their adjusted positions. The adjusting means comprise an unthreaded, cylindrical stud extending from the camshaft into a radially extending slotted opening through the second drive member. The opening includes angularly spaced, parallel sides. An eccentric cam is freely rotatable on the cylindrical stud and closely fits between the parallel sides of the slotted opening. A tool receiving portion on the cam is arranged for permitting selected rotation of the cam to cause relative angular adjustment of the second drive member relative to the camshaft. The slotted opening and the eccentric cam have cooperating interengaging portions lying in a plane perpendicular to the axis of rotation of the camshaft for retaining the cam in the slotted opening while permitting free rotation of the cam relative to the second drive member.

In accordance with a more limited aspect of the invention, the tool receiving portion of the cam comprises a central opening which extends completely through the cam. One end of the opening closely receives the cylindrical stud and the other end of the opening is accessible from the exterior of the slotted opening. Preferably, the central opening through the cam is of non-circular cross section but adapted to be closely received on the cylindrical stud.

In accordance with a still further and more limited aspect of the invention, the interengaging portions between the eccentric cam and the slotted opening comprise a shoulder formed on the cam and an overlying shoulder formed in the slotted opening.

Preferably the means used for securing the second drive member to the camshaft includes a plurality of threaded studs which are totally independent of the stud which carries the eccentric cam. By making the cam adjustment entirely separate of the threaded clamping or securing studs, a simpler and improved adjusting and clamping arrangement results. Additionally, there is no possibility of having the cam locked in position or come out of adjustment when the clamping is accomplished.

As can be seen from the foregoing, a primary object of the invention is the provision of a relatively simple and reliable arrangement for permitting angular adjustment of timing gears and sprockets.

A further object of the invention is the provision of a timing gear adjustment of the type described wherein the adjusting eccentric is separate and independent from the gear or sprocket clamping studs.

An additional object is the provision of a adjusting assembly of the general type described wherein the adjusting cam is maintained in position by interengaging shoulders on the cam and the associated sprocket or drive member.

BRIEF DESCRIPTION OF THE DRAWINGS

The above and other objects and advantages will become apparent from the following description when read in conjunction with the accompanying drawings wherein:

FIG. 1 is an end view of an engine incorporating the adjustable timing drive assembly of the subject invention;

FIG. 2 is a cross-sectional view taken on line 2—2 of FIG. 1;

FIG. 3 is a cross-sectional view taken on line 3—3 of FIG. 2;

FIG. 4 is a view taken on line 4—4 of FIG. 2; and,

FIG. 5 is an exploded, pictorial view of the components illustrated in FIG. 2.

DETAILED DESCRIPTION OF THE PREFERRED EMBODIMENT

Referring more particularly to the drawings wherein the showings are for purposes of illustrating the preferred embodiments of the invention only, and not for the purpose of limiting same, FIG. 1 shows the overall arrangement of an internal combustion engine indicated generally by the numeral 10. The engine is illustrated as being of a type including an engine housing 12 which includes a V-type cylinder block. The housing 12 carries a crank shaft 14 and a camshaft 16 which are interconnected in the usual manner by a positive drive cog belt 18 extending between a drive gear or sprocket assembly 20 on the crank shaft 14 and a driven gear or sprocket 22 on the camshaft 16. It should be appreciated that the invention is equally applicable to chain type drive connections.

FIGS. 2 through 5 show in detail the preferred form of the adjusting means for adjusting the relative angular positions between the camshaft drive member and the camshaft itself. In this embodiment, as previously mentioned, the drive member is a drive gear or sprocket assembly 22 which includes a main camshaft drive member in the form of gear or sprocket member 24 which has a toothed outer periphery 26 and an inner mounting web 28. The main camshaft gear 24 is releasably connected to a camshaft gear hub element 30 in any convenient manner, such as through the use of a plurality of button head cap screws 32. As shown, the screws 32 pass through openings 34 formed in the web 28 of the camshaft gear element 24. As can be appreciated, the cap screws 32 extend into suitably threaded openings 36 formed through the periphery of the hub 30. Both the main gear 24 and the hub 30 are formed from suitable high-strength materials and could, if desired, be formed as a single unitary element depending upon the particular needs of the installation or the like.

Of particular importance to the subject invention is the arrangement for connecting the driven sprocket or gear assembly 22 to the camshaft 16. In this regard, attention is directed to FIGS. 2 and 5 wherein it is seen that the camshaft gear hub element 30 is provided with three elongated openings 50 which are spaced approximately 120° apart circumferentially of the raised center portion. Aligned threaded openings are formed in the end hub 52 of the camshaft 16. These openings are identified with the numeral 54 and have a size and thread formed to receive socket head machine screws 56. It should be noted that the openings 50 are, as previously mentioned, elongated in a direction circumferentially of the hub 30 and have an internal flange or shoulder 59 against which the underside of the socket head cap screws 56 engage to clamp the hub 30 in position on the hub 52. As can be appreciated, by loosening the machine screws 56, the angular adjustment of the hub 30 relative to the hub 52 can be shifted somewhat depending upon the circumferential or arcuate length of the individual openings 50. After adjustment, it can then be retightened in the desired adjusted position for precision final adjustment of the engine timing.

The means used for precision movement and adjustment of the hub 30 relative to the hub 52 comprises an eccentric assembly 60 best seen in FIGS. 3 and 4. The eccentric assembly 60 generally comprises a cam member 62 which is provided with a stepped diameter outer configuration including a first, somewhat larger diameter portion 64 and an integral aligned section 66 of slightly smaller diameter. The two sections 64 and 66 are joined by a shoulder 68 that lies in a plane perpendicular to the axes of the sections 64 and 66.

The cam member 62 is mounted for free rotation relative to hub 52 and gear hub element 30. As best seen in FIGS. 3, 4, and 5, a circular pin element 70 extends perpendicular from the hub 52, and the cam 62 is rotatably received thereon. In this regard, the cam 62 includes a through opening 72 which is of hex configuration throughout the entire axial length of the cam. The distance between opposed faces of the hex configuration are only slightly larger than the diameter of the pin 70 so that the cam is freely rotatable on the pin 70. As best seen in FIG. 3, the length of the pin 70 is such as to extend only a short distance into the opening 72. Thus, the outer or left-hand end (as viewed in FIG. 3) of the opening 72 is open to receive a suitable hex wrench or the like for rotating the cam on pin 70.

Referring in particular to FIGS. 4 and 5, it will be seen that the cam 62 extends into an elongated opening 78 formed through the gear hub element 30. Opening 78 has a width W which at its outer end is only slightly larger than the diameter of portion 66 of cam 62. The inner portion of the opening 78 has a transverse or width in the circumferential direction which is only slightly larger than the diameter of section 64 of cam 62. These two sections are joined by a transverse shoulder 80 which engages against the shoulder 68 of cam 62. As illustrated in FIG. 4, however, the overall length of the opening 78 in a radial direction is greater than the corresponding diameters of portions 64 and 66 of cam 62. Because of the eccentric location of the opening 72, rotation of the cam 62 causes an angular shift in the relative positions of gear hub element 30 and hub 52. Thus, when the socket head machine screws 56 are slightly loosened, the rotation of cam 62 can be used to precision adjust the angular relative positions of hub 30 and hub 52 to thus precisely change or adjust the engine timing.

It is important to note that the relationship between the cam member 62 and the gear hub element 30 is such that the cam is completely retained in place without the use of any special retainers. That is, the cooperating surfaces 80 and 68 retain the cam 62 in its located position on the pin 70. Additionally, the simple broached through opening 72 provides both the required tool receiving surfaces and the pivotal mounting surfaces necessary for the cam.

In addition to the above, it should be noted that the exterior end of the cam 62 can be provided with suitable indicia, such as the indicated marking 82. Correspondingly spaced indicia or marks can be placed on the gear to provide the user with an indication of the degree or position of adjustment.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In an internal combustion engine having an output shaft and a camshaft operable in timed relation with the output shaft of a variable camshaft timing drive comprising:

a first rotatable drive member driven by the output shaft, a second rotatable drive member mounted on the camshaft and operably connected with the first drive member for rotation in timed relation therewith, means mounting said second drive member on said camshaft for rotation on a common axis, said second drive member and said camshaft having opposing engagable surfaces capable of being secured together to fix the angular relation of said members, said mounting means being formed to permit limited relative angular rotation of said members when said surfaces are not so secured, and means for adjusting the relative angular positions of said second drive member and said camshaft and means for securing said second drive member to said camshaft in selected positions, said adjusting means comprising an unthreaded cylindrical stud extending from said camshaft into a radially extending slotted opening through said second drive member, said slotted opening having angularly spaced, parallel sides, an eccentric cam freely rotatable on the cylindrical stud and closely fitting between said parallel sides, a tool receiving portion on said eccentric cam for permitting selected rotation of said eccentric cam to cause relative angular adjustment of said second drive member relative to said camshaft, said slotted opening and said eccentric cam having cooperating interengaging portions lying in a plane perpendicular to an axis of rotation of the camshaft for retaining the eccentric cam in the slotted opening while permitting free rotation of the eccentric cam.

2. The combination as defined in claim 1 wherein said tool receiving portion comprises a central opening extending completely through the eccentric cam, one end of said central opening closely receiving the cylindrical stud and the other end of said central opening being accessible from the exterior of said slotted opening.

3. The combination as defined in claim 1 wherein said cam comprises axially aligned cylindrical portions with a shoulder at the juncture between said cylindrical portions.

4. The combination as defined in claim 1 wherein said interengaging portions include a shoulder on said eccentric cam and an overlying shoulder in said slotted opening.

5. The combination as defined in claim 1 wherein eccentric cam includes indicia carried thereon for visually indicating the angular relationship between the first and second drive members.

6. The combination as defined in claim 1 wherein said tool receiving portion on said eccentric cam comprises a central opening extending into said eccentric cam in axial alignment with said cylindrical stud.

7. The combination as defined in claim 6 wherein said central opening extends completely through said eccentric cam and closely surrounds said cylindrical stud.

8. The combination as defined in claim 7 wherein said central opening is of constant non-circular cross-section completely through the eccentric cam.

9. The combination as defined in claim 8 wherein said means for securing said second drive member to said camshaft includes a plurality of threaded studs.

10. The combination as defined in claim 9 wherein the eccentric cam is totally within said second drive member.

11. The combination as defined in claim 10 wherein the cylindrical stud terminates within the eccentric cam.

* * * * *